(12) United States Patent
Yeh et al.

(10) Patent No.: US 10,364,967 B2
(45) Date of Patent: Jul. 30, 2019

(54) DISPLAY DEVICE

(71) Applicant: InnoLux Corporation, Miao-Li County (TW)

(72) Inventors: Hu-Shun Yeh, Miao-Li County (TW); You-Ren Liou, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 16 days.

(21) Appl. No.: 15/663,835

(22) Filed: Jul. 31, 2017

(65) Prior Publication Data

US 2018/0119932 A1 May 3, 2018

Related U.S. Application Data

(60) Provisional application No. 62/416,679, filed on Nov. 2, 2016, provisional application No. 62/442,454, filed on Jan. 5, 2017.

(51) Int. Cl.
| | |
|---|---|
| *F21V 21/00* | (2006.01) |
| *G09G 3/34* | (2006.01) |
| *G02F 1/13* | (2006.01) |
| *F21Y 107/10* | (2016.01) |
| *F21Y 107/20* | (2016.01) |

(52) U.S. Cl.
CPC ............... *F21V 21/00* (2013.01); *G02F 1/13* (2013.01); *G09G 3/3406* (2013.01); *F21Y 2107/10* (2016.08); *F21Y 2107/20* (2016.08); *G09G 2320/0233* (2013.01)

(58) Field of Classification Search
USPC ............................................................ 362/97
See application file for complete search history.

(56) References Cited

U.S. PATENT DOCUMENTS

| | | | | |
|---|---|---|---|---|
| 2010/0277920 A1* | 11/2010 | Choi | ........................ | F21S 8/086 362/249.06 |
| 2013/0208495 A1* | 8/2013 | Dau | ........................ | F21V 7/0008 362/551 |

* cited by examiner

*Primary Examiner* — Matthew Mikels
(74) *Attorney, Agent, or Firm* — Winston Hsu

(57) ABSTRACT

A display device includes a substrate, a plurality of first light-emitting units, a first driving unit, a plurality of second light-emitting units, and a second driving unit. The substrate has a top surface facing an object, and the top surface includes two local surfaces for disposing the first light-emitting units and the second light-emitting units respectively. The first driving unit and the second driving unit provide different currents based on an included angle between a line passing through the object and a center of each local surface and an extended line starting from the center of each local surface and paralleling the normal direction of each local surface.

20 Claims, 10 Drawing Sheets

DISPLAY DEVICE

CROSS REFERENCE TO RELATED APPLICATION

This application claims the benefit of U.S. Provisional Application Ser. No. 62/416,679, filed Nov. 2, 2016, and this application also claims the benefit of U.S. Provisional Application Ser. No. 62/442,454, filed Jan. 5, 2017.

BACKGROUND OF THE DISCLOSURE

1. Field of the Disclosure

The present disclosure relates to a display device, and more particularly, to a display device having a backlight module that can provide light to a user.

2. Description of the Prior Art

With the evolution of technology, digital displays not only are used inside the building or on hand, but also are increasingly used in cockpits of vehicles, for example, cockpits of cars. Various display devices may be mounted on or in vehicles. With display devices, users may, for example, receive real-time traffic information, send and receive e-mails, get information via internet, use a remote diagnostic service for a passenger in the vehicle or the car itself, listen to music, play on-line games, and watch television (TV) and movies. According to the user's requirement, a display device is developed for display more information. However, since the display device has a wide display surface, the user usually receive different light intensity distribution from different parts of the display surface, which would results in uncomfortableness for the user.

SUMMARY OF THE DISCLOSURE

The present disclosure provides a display device that includes a substrate, a plurality of first light-emitting units, a first driving unit, a plurality of second light-emitting units and a second driving unit. The substrate has a top surface facing an object, in which the top surface includes a first local surface and a second local surface, the first local surface has a first normal direction, the object and a center of the first local surface form a first line, an included angle between the first line and a first extended line starting from the center of the first local surface and paralleling the first normal direction defines as a first included angle, and wherein the second local surface has a second normal direction, the object and a center of the second local surface form a second line, an included angle between the second line and a second extended line starting from the center of the second local surface and paralleling the second normal direction defines as a second included angle. The first light-emitting units are disposed on the first local surface. The first driving unit is electrically connected to the first light-emitting units, and the first driving unit provides a first current to each first light-emitting unit. The second light-emitting units are disposed on the second local surface. The second driving unit is electrically connected to the second light-emitting units, and the second driving unit provides a second current to each second light-emitting unit. The first included angle is less than the second included angle, and the first current is less than the second current.

The present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each device and angles shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

In this disclosure, different features in different embodiments can be combined, replaced, or mixed by one of ordinary skill in the art to form another embodiment.

Figure 1:
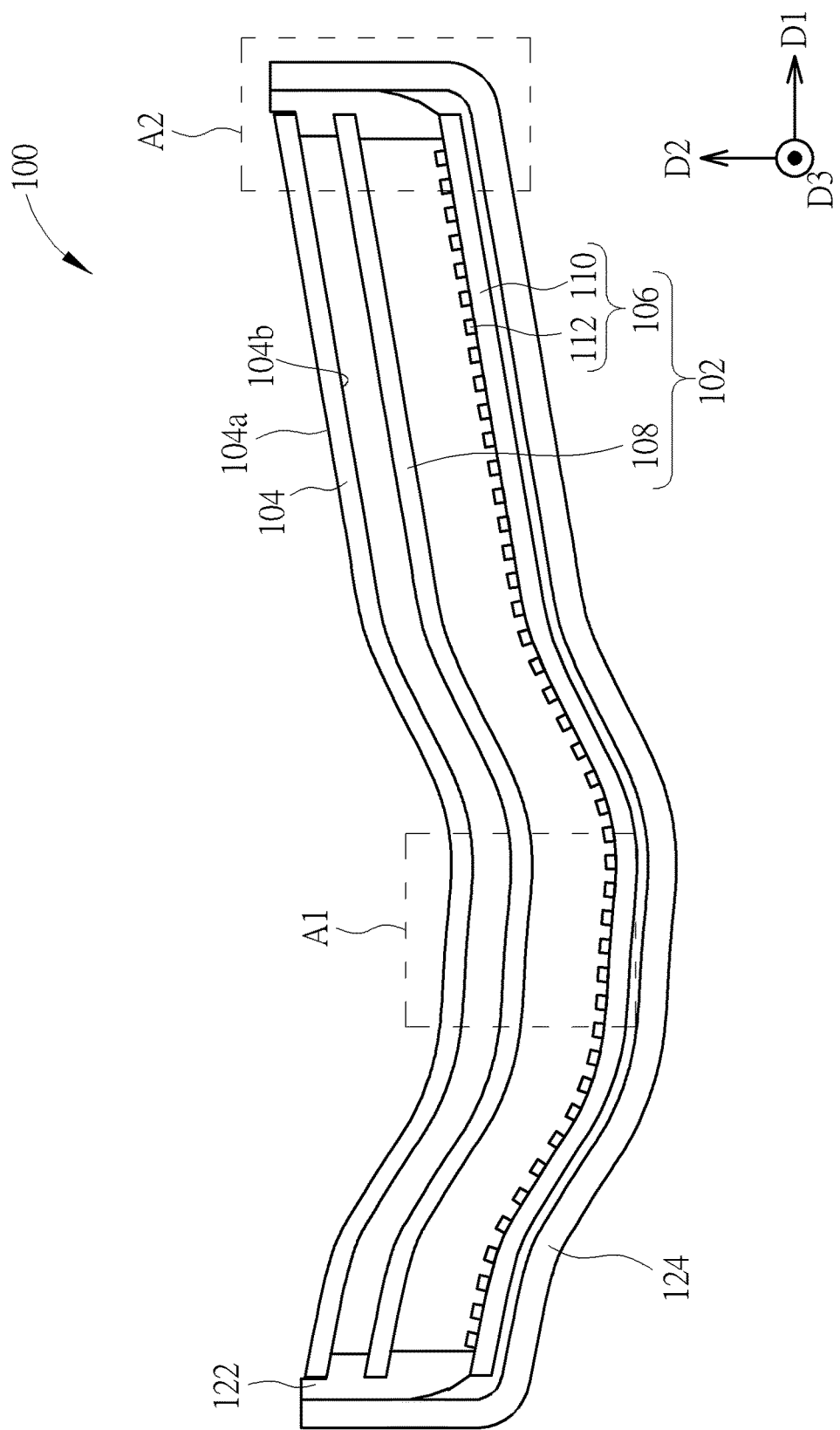
FIG. 1 schematically illustrates a side view of a display device according to an embodiment of the present disclosure.
Figure 2:
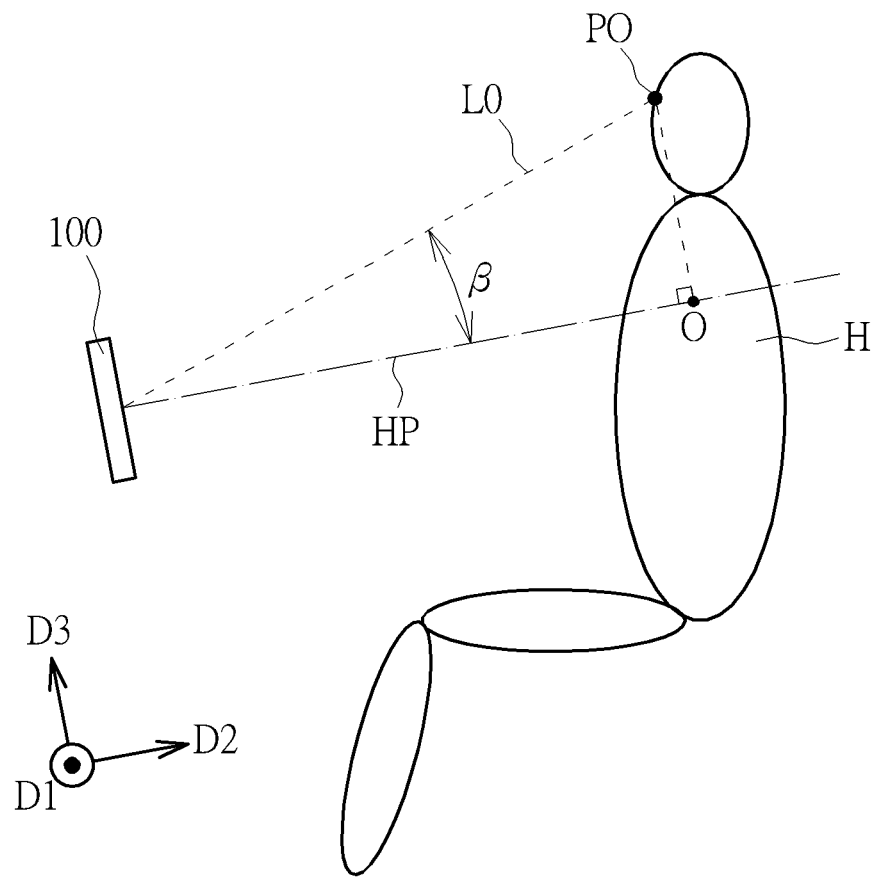
FIG. 2 schematically illustrates a relative position between the display device and a user.

FIG. 1 schematically illustrates a side view of a display device according to an embodiment of the present disclosure, and FIG. 2 schematically illustrates a relative position between the display device and a user. Referring to FIG. 1, the display device 100 includes a backlight module 102 and a display panel 104. The display panel 104 has a front surface 104a for displaying images and a back surface 104b for allowing a backlight to penetrate through. In one embodiment, the display panel 104 may be a liquid crystal display panel or a quantum dot display panel, but not limited thereto. In this embodiment, the backlight module 102 is disposed on the back surface 104b and used for generating the backlight and emitting the backlight to the display panel 104. The backlight module 102 may include a light source 106 and an optical film stack 108 for uniforming light generated from the light source 106, wherein the optical film stack 108 is disposed on the light source 106. In this disclosure, the display device and backlight module may be curved or flat and it may apply to vehicles, outdoor advertisement, game console, medicals, industry or other consumer electronics. However, the disclosure is not limited to the above applications.

Referring to FIG. 2, the display device 100 is disposed in front of the user H. A plane constituted by a first direction D1 and a second direction D2 is a horizontal plane HP. The first direction D1 is perpendicular to the second direction D2. In this embodiment and other embodiments, the horizontal plane HP is defined as a plane perpendicular to a display surface of the display device 100 that is the front surface 104a of the display panel 104. In this embodiment, the eyes of the user H are not located in the horizontal plane HP. A center of the display device 100 and a center of the eyes that serves as a predetermined object PO can form a line L0, and the line L0 and the horizontal plane HP may have an included angle β that can serve as a vertical viewing angle of the user H.

Figure 3:
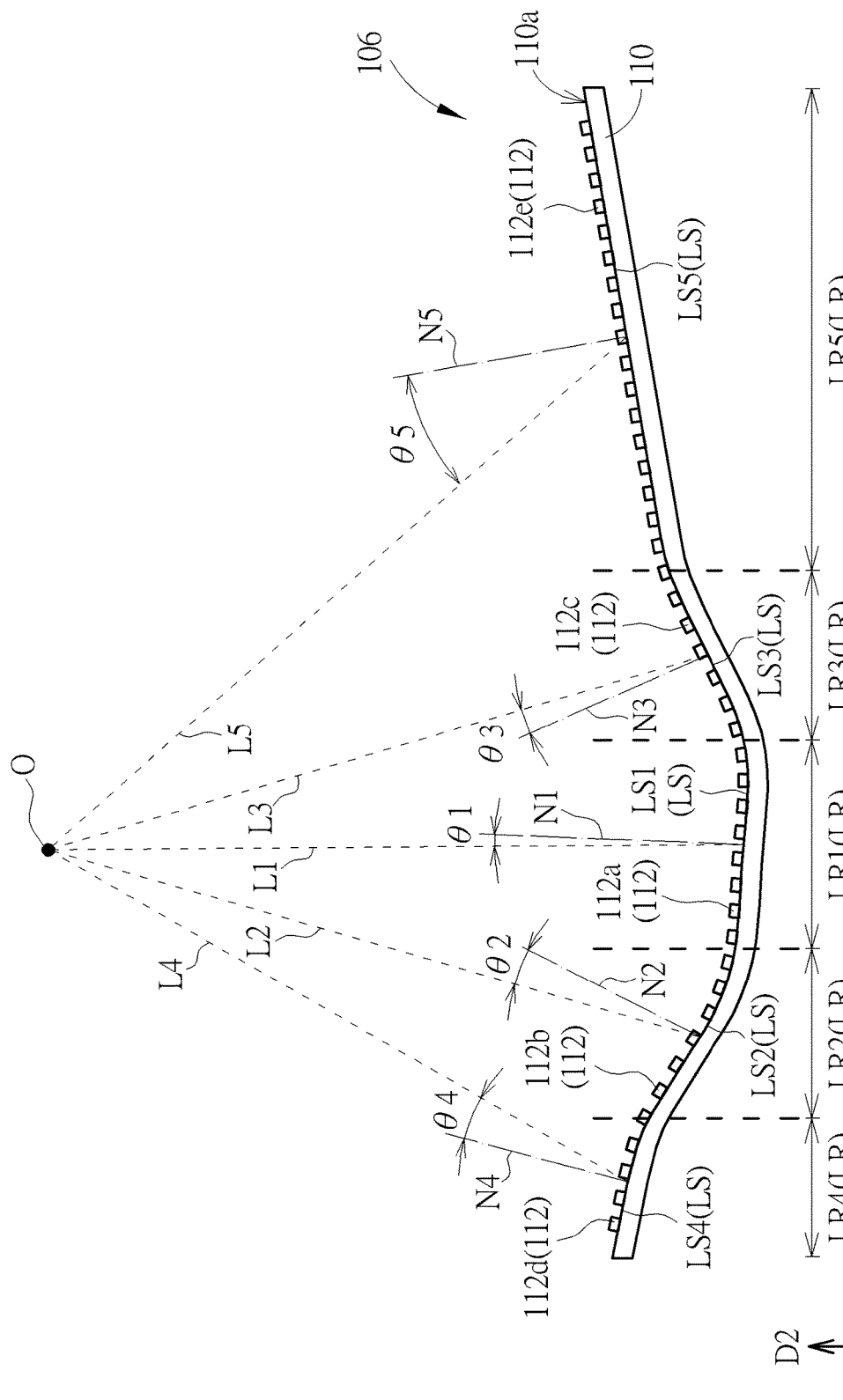
FIG. 3 illustrates a side view of the light source according to an embodiment of the present disclosure.
Figure 4:
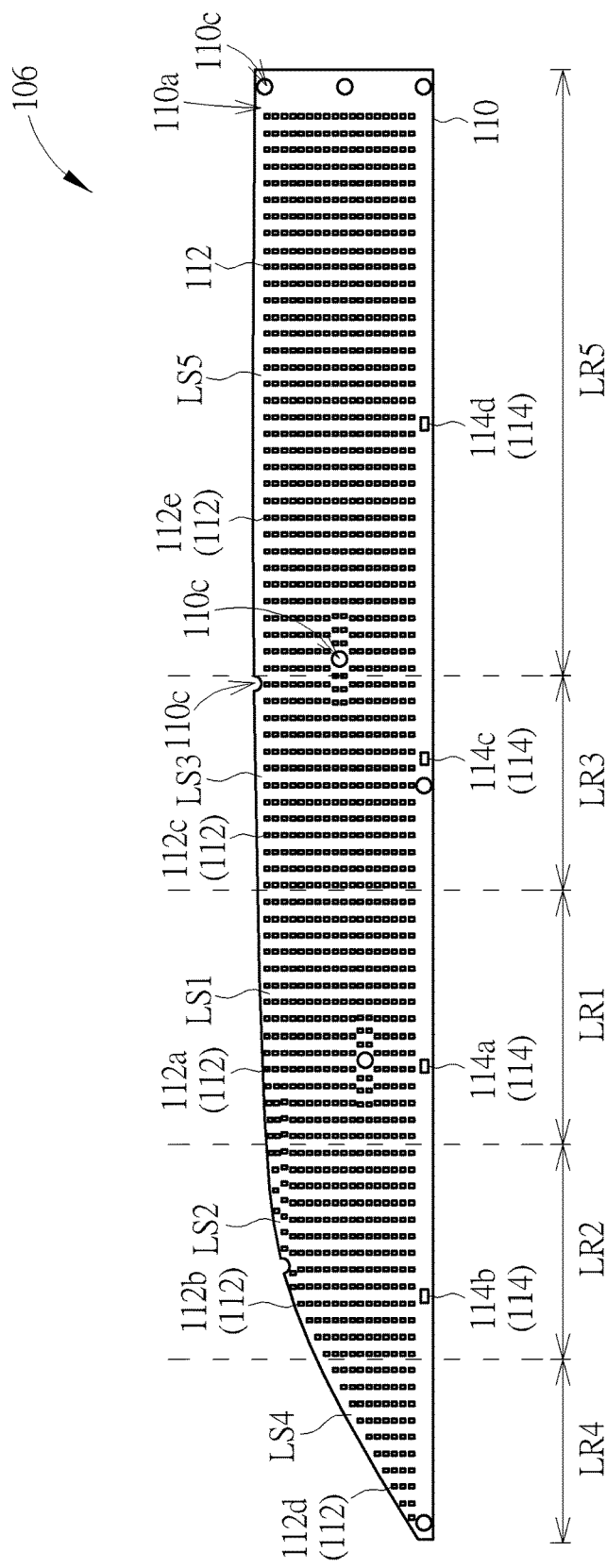
FIG. 4 illustrates a top view of the light source according to the embodiment of the present disclosure.

FIG. 3 illustrates a side view of the light source according to an embodiment of the present disclosure, and FIG. 4 illustrates a top view of the light source according to the embodiment of the present disclosure. Referring FIG. 3 and FIG. 4 together with FIG. 1, the light source 106 includes a substrate 110, a plurality of light-emitting units 112 and a plurality of driving units 114. In this disclosure, the substrate 110 may be curved or flat and its material may include plastic, ceramic, or glass. The substrate 110 has a top surface 110a facing the back surface 104b of the display panel 104. The top surface 110a has at least two local regions LR. In this embodiment, the top surface 110a has a plurality of local regions LR, for example, a first local region LR1, a second local region LR2, a third local region LR3, a fourth local region LR4 and a fifth local region LR5, but not limited thereto. In different local regions LR, the top surface 110a may face different directions. In other words, the top surface 110a may include at least two local surfaces LS. In this embodiment, the top surface 110a may include a plurality of local surfaces LS in the corresponding local region LR respectively, in which the local surfaces LS are arranged along the first direction D1, and each local surface LS is parallel to a third direction D3. For example, the top surface 110a has a first local surface LS1 in the first local region LR1, a second local surface LS2 in the second local region LR2, a third local surface LS3 in the third local region LR3, a fourth local surface LS4 in the fourth local region LR4 and a fifth local surface LS5 in the fifth local region LR5, in which the fourth local surface LS4, the second local surface LS2, the first local surface LS1, the third local surface LS3 and the fifth local surface LS5 are sequentially arranged along the first direction D1, and any two of the local surfaces LS adjacent to each other may be connected to each other. Each local surface LS may have a normal direction, and the normal directions of different local surfaces LS may be different. In this embodiment, each local surface LS may not be flat, and may be curved and perpendicular to the horizontal plane HP. Also, a direction perpendicular to a plane constituted by two sides of each local surface LS may define as the normal direction of the corresponding local surface LS, the normal directions are located in the same horizontal plane HP, but the present disclosure is not limited thereto. One of the two sides of each local surface LS is located between neighboring local surfaces LS. For example, the first local surface LS1, the second local surface LS2, the third local surface LS3, the fourth local surface LS4 and the fifth local surface LS5 may have a first normal direction N1, a second normal direction N2, a third normal direction N3, a fourth normal direction N4 and a fifth normal direction N5 respectively.

In one embodiment, referring FIG. 2 and FIG. 3, a projection of the predetermined object PO on the horizontal plane HP defines as an object O. The position of the object O on an axis paralleling the first direction D1 is determined by the position of the center of the eyes of a user H when the user looks at the display device at a normal usage position. If the display device is applied to an automotive, the user H is the driver and looks at the display device when seating on the driver's seat. Because the object O is the projection of the center of the eyes on the horizontal plane HP, the height of the user H can be ignored. The top surface 110a faces the object O. The object O and a center of the first local surface LS1 may form a first line L1, and an included angle between the first line L1 and a first extended line starting from the center of the first local surface LS1 and paralleling the first normal direction N1 defines as a first included angle θ1 that is a horizontal viewing angle of the eyes seeing the first local surface LS1. In this disclosure, the center of the first local surface LS1 distances from each of the two sides of the first local surface LS1 with the same distance in the side view. So does other local surfaces LS. Besides, the object O is an orthogonal projection of the predetermined object PO on the horizontal plane HP. Similarly, the object O and a center of the second local surface LS2 may form a second line L2, and an included angle between the second line L2 and a second extended line starting from the center of the second local surface LS2 and paralleling the second normal direction N2 defines as a second included angle θ2; the object O and a center of the third local surface LS3 may form a third line L3, and an included angle between the third line L3 and a third extended line starting from the center of the third local surface LS3 and paralleling the third normal direction N3 defines as a third included angle θ3; the object O and a center of the fourth local surface LS4 may form a fourth line L4, and an included angle between the fourth line L4 and a fourth extended line starting from the center of the fourth local surface LS4 and paralleling the fourth normal direction N4 defines as a fourth included angle θ4; and the object O and a center of the fifth local surface LS5 may form a fifth line L5, and an included angle between the fifth line L5 and a fifth extended line starting from the center of the fifth local surface LS5 and paralleling the fifth normal direction N5 defines as a fifth included angle θ5. The first included angle θ1 is in a first angle range, and the second included angle θ2 is in a second angle range. The first angle range doesn't overlap the second angle range. In this embodiment, each angle in the first angle range may be less than each angle in the second angle range. For example, the first angle range may be from 0 degree to 10 degrees, and the second angle range is greater than 10 degrees and less than or equal to 90 degrees, but not limited thereto. The third included angle θ3, the fourth include angle θ4 and/or the fifth included angle θ5 of this embodiment may be in the second angle range, but the present disclosure is not limited thereto. In another embodiment, the third included angle θ3, the fourth include angle θ4 and/or the fifth included angle θ5 may be in a third angle range different from the first angle range and the second angle range or in the first angle range.

In another embodiment, referring to FIG. 3, the object O can be simplified to a point from a side view of the light source. On the other hand, the position of the object O on an axis paralleling the second direction D2 distances from the top surface 110a of the substrate 100 by 70 centimeters along the second direction D2. It should be noted that 70 centimeters is an exemplary distance used for predetermining the position of the object when the designers designing the display device. Practically, the minimum distance between the object and the first local surface LS1 may range from 20 centimeters to 120 centimeters, though the disclosure is not limited to the above range. And the minimum distance is measured along the second direction D2.

Referring FIG. 3 and FIG. 4, the light-emitting units 112 include a plurality of first light-emitting units 112a disposed on the first local surface LS1 and a plurality of second light-emitting units 112b disposed on the second local surface LS2. Since the first included angle θ1 is different from the second included angle θ2, when each light-emitting unit 112 is applied with the same current to provide light with the same intensity, the predetermined object PO may receive light with different intensity distributions respectively from the first light-emitting units 112a on the first local surface LS1 and from the second light-emitting units 112b on the second local surface LS2. In this embodiment, the driving units 114 may include a first driving unit 114a and a second driving unit 114b, in which the first driving unit 114a is electrically connected to the first light-emitting units 112a and provides a first current to each first light-emitting unit 112a, and the second driving unit 114b is electrically connected to the second light-emitting units 112b and provides a second current to each second light-emitting unit 112b. It should be noted that in order to uniform the light intensity distribution of the light from the first light-emitting units 112a received by the predetermined object PO and the light intensity distribution of the light from the second light-emitting units 112b received by the predetermined object PO, the first current provided to each first light-emitting unit 112a is different from the second current provided to each second light-emitting unit 112b in this embodiment. The first included angle is less than the second included angle, and the first current is less than the second current. In other words, when the first included angle is less than the second included angle and the first current is the same as the second current, more light from the first light-emitting units 112a can be illuminated onto the predetermined object PO as compared with light from the second light-emitting units 112b. Accordingly, to lower the first current to be less than the second current can effectively uniform the light intensity distribution from the first light-emitting units 112a and the light intensity distribution from the second light-emitting units 112b received by the predetermined object PO. In one embodiment, the light-emitting units disposed on each local surface LS are electrically connected to the same driving units, i.e. local dimming IC, and are regarded as an independent controllable block. Therefore, the number of the independent controllable blocks is the same as the number of the local surfaces LS. However, in another embodiment, different local surfaces LS have different normal directions respectively.

As we can see from the above-mentioned, since the substrate 110 has different local surfaces LS, and the normal directions of the local surfaces LS have different included angles with the lines formed of the local surface LS and the predetermined object PO respectively, the currents provided to the light-emitting units 112 in different local surfaces LS are different, so as to uniform the light intensity distribution. More specifically, when the first angle range that the first included angle θ1 lies in is less than the second angle range that the second included angle θ2 lies in, the first current provided to the first light-emitting units 112a on the first local surface LS1 is less than the second current provided to the second light-emitting units 112b on the second local surface LS2. Accordingly, not only the light intensity distribution may be uniformed, but also the number of the driving units may be saved. Thus, the user can receive more comfortable light intensity distribution.

The light-emitting units 112 may further include a plurality of third light-emitting units 112c on the third local surface LS3, a plurality of fourth light-emitting units 112d on the fourth local surface LS4 and a plurality of fifth light-emitting units 112e on the fifth local surface LS5. In this embodiment, because the first light-emitting units 112a are disposed between the second light-emitting units 112b and the third light-emitting units 112c, the driving units 114 may further include a third driving unit 114c electrically connected to the third light-emitting units 112c for providing a third current to each third light-emitting unit 112c, but not limited herein. In another embodiment, the third light-emitting units 112c may be electrically connected to the second driving unit 114b. Since the third included angle is in the second angle range, the third current may be the same as the second current. In another embodiment, when the third included angle θ3 is in the third angle range, the third current may be different from the first current and the second current. Furthermore, since the fourth light-emitting units 112d are disposed on the fourth local surface LS4 connected to the second local surface LS2 for disposing the second light-emitting units 112b, and the fourth included angle θ4 is in the second angle range, the fourth light-emitting units 112d may be electrically connected to the second driving unit 114b respectively when the number of the second light-emitting units 112b and the fourth light-emitting units 112d is less than the load that the second driving unit 114b can afford. Accordingly, the second driving unit 114b may provide the second current to each fourth light-emitting unit 112d, thereby extra driving unit for driving the fourth light-emitting unit may be saved. In another embodiment, when the fourth included angle θ4 may be in a fourth angle range different from the second angle range, the fourth light-emitting units 112d may be electrically connected to a fourth driving unit for providing a fourth current different from the second current to each fourth light-emitting unit 112d. In this embodiment, when the number of the light-emitting units 112 is in excess of the load of one driving unit 114, the light-emitting units 112 in adjacent local surfaces LS may be electrically connected to different driving units 114. For example, the driving units 114 may further include a fourth driving unit 114d electrically connected to the fifth light-emitting units 112e for providing a fifth current to each fifth light-emitting unit 112e, and the fifth current may be the same as the second current because the fifth included angle θ5 is in the second angle range. For this reason, the third light-emitting units 112c and the fifth light-emitting units 112e disposed on the third local surface LS3 and the fifth local surface LS5 adjacent to each other respectively are electrically connected to different driving units 114c, 114d. In another embodiment, when the number of the light-emitting units 112 in one of the local surfaces LS, the light-emitting units 112 in this local surface LS may be electrically connected to two or more driving units 114 to provide enough driving current to each light-emitting unit 112. In another embodiment, at least two of the local surfaces may have the included angles in the first angle range, and the light-emitting units disposed on these local surfaces may be electrically connected to one or more driving units that can provide the first current.

In this embodiment, the number of the light-emitting units 112 on the top surface 110a may be over a thousand, and the light-emitting units 112 may be spaced apart from each other. Each light-emitting unit 112 may for example include a light-emitting diode (LED), a micro-sized LED (called micro-LED) or other kinds of light-emitting units. The light-emitting units 112 may be directly on the top surface 110a, but not limited thereto. Moreover, the driving units 114 may be disposed at the same side of the light-emitting units 112 and on the substrate 110, but the present disclosure is not limited thereto. Also, the substrate 110 may further include a circuit board for electrically connecting the light-emitting units 112 to the corresponding driving unit 114. Since those of ordinary skill in the art may know the structure of circuit board that may include a plurality of wires and may include multilayer stack, the circuit board will not be detailed.

Figure 5:
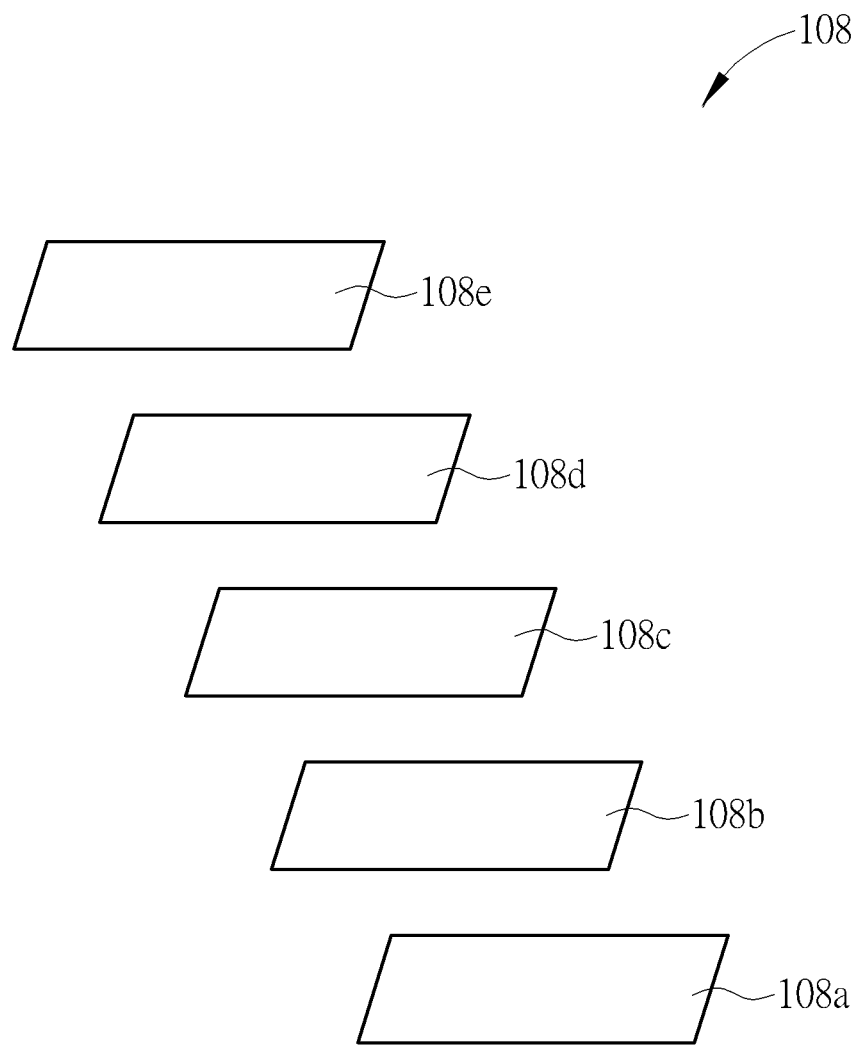
FIG. 5 schematically illustrates an exploded view of the optical film stack according to the present embodiment of the present disclosure.
Figure 6:
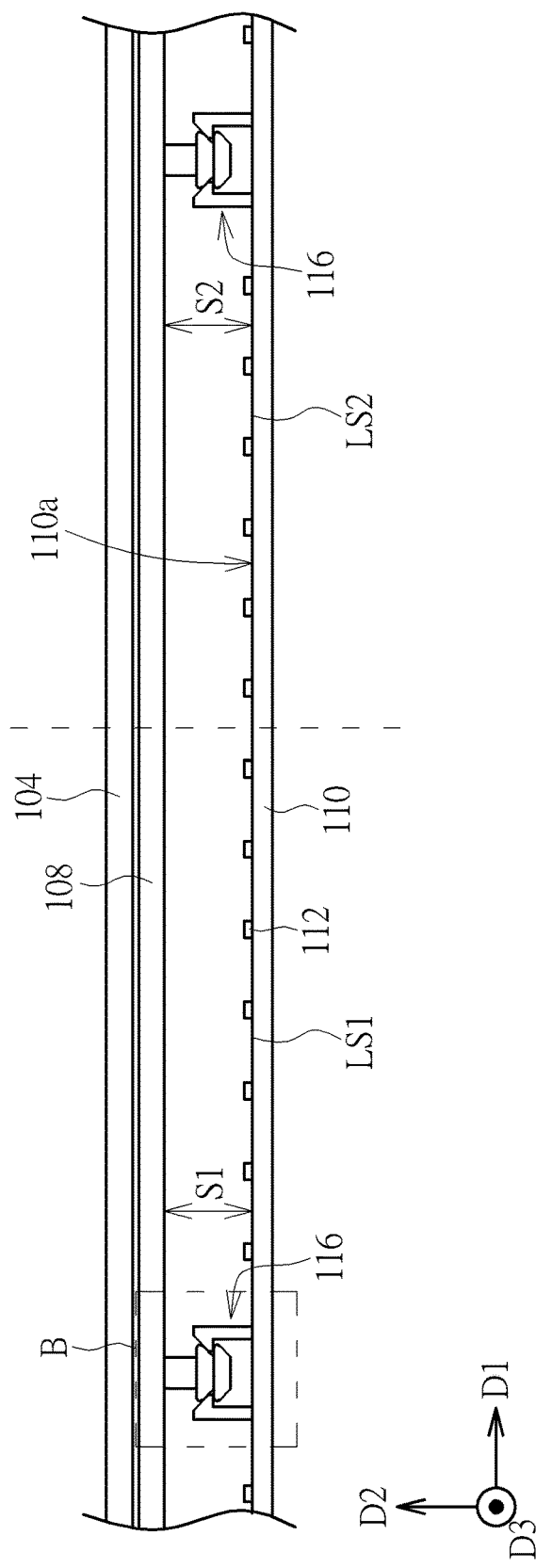
FIG. 6 schematically illustrates an enlarged view of a region A1 shown in FIG. 1.

Referring to FIG. 1, in addition, the optical film stack 108 is disposed between the substrate 110 and the display panel 104 and used for diffuse the lights generated from the light-emitting units 112, so as to uniform the light intensity distribution. FIG. 5 schematically illustrates an exploded view of the optical film stack according to the present embodiment of the present disclosure. Referring to FIG. 5, the optical film stack 108 may include a plurality of optical films. For example, the optical film stack 108 may include a diffuser plate 108a, a diffuser film 108b, a first brightness enhancement film (BEF) 108c, a second BEF 108d and a dual BEF (DBEF) 108e stacked sequentially along the second direction D2. The first BEF 108c and the second BEF 108d may include a plurality of stripe-shaped prisms respectively, and the stripe-shaped prisms of the first BEF 108c cross the stripe-shaped prisms of the second BEF 108d. Since those of ordinary skill in the art may know the optical film stack 108 used for diffusing light may be constituted by different stack, the optical film stack 108 will not be detailed. FIG. 6 schematically illustrates an enlarged view of a region A1 shown in FIG. 1. In this embodiment, a spacing exists between the optical film stack 108 and the top surface 110a may be uniform. For example, a first spacing S1 exists between the optical film stack 108 and the first local surface LS1, and a second spacing S2 exists between the optical film stack 108 and the second local surface LS2. The first spacing S1 may be substantially the same as the second spacing S2, so that the lights generated from the light-emitting units 112 can be diffused evenly by the optical film stack 108.

Referring to FIG. 6 and FIG. 4, the backlight module 102 may further include a plurality of support structures 116 disposed between the optical film stack 108 and the top surface 110a. At least one of support structure 116 is allowed to be collapsed, so that its height may be reduced to allow the display panel 104 to press downward and to provide a buffer to the display panel 104. Since the display panel may use glass as its substrate, the support structure 116 can prevent the glass from break or crack when the vehicle for carrying the user H is hit, thereby avoiding the user H being injured by broken glass pieces. The support structures 116 may be disposed among and spaced apart from the light-emitting units 112 and be spread on the top surface 110a to evenly support the optical film stack 108. For example, the substrate 110 may have a plurality of through holes 110c disposed at edges of the substrate 110 and among the light-emitting units 112. Each support structure 116 may be engaged with corresponding through hole 110c respectively, so as to be fixed on the substrate 110.

Figure 7:
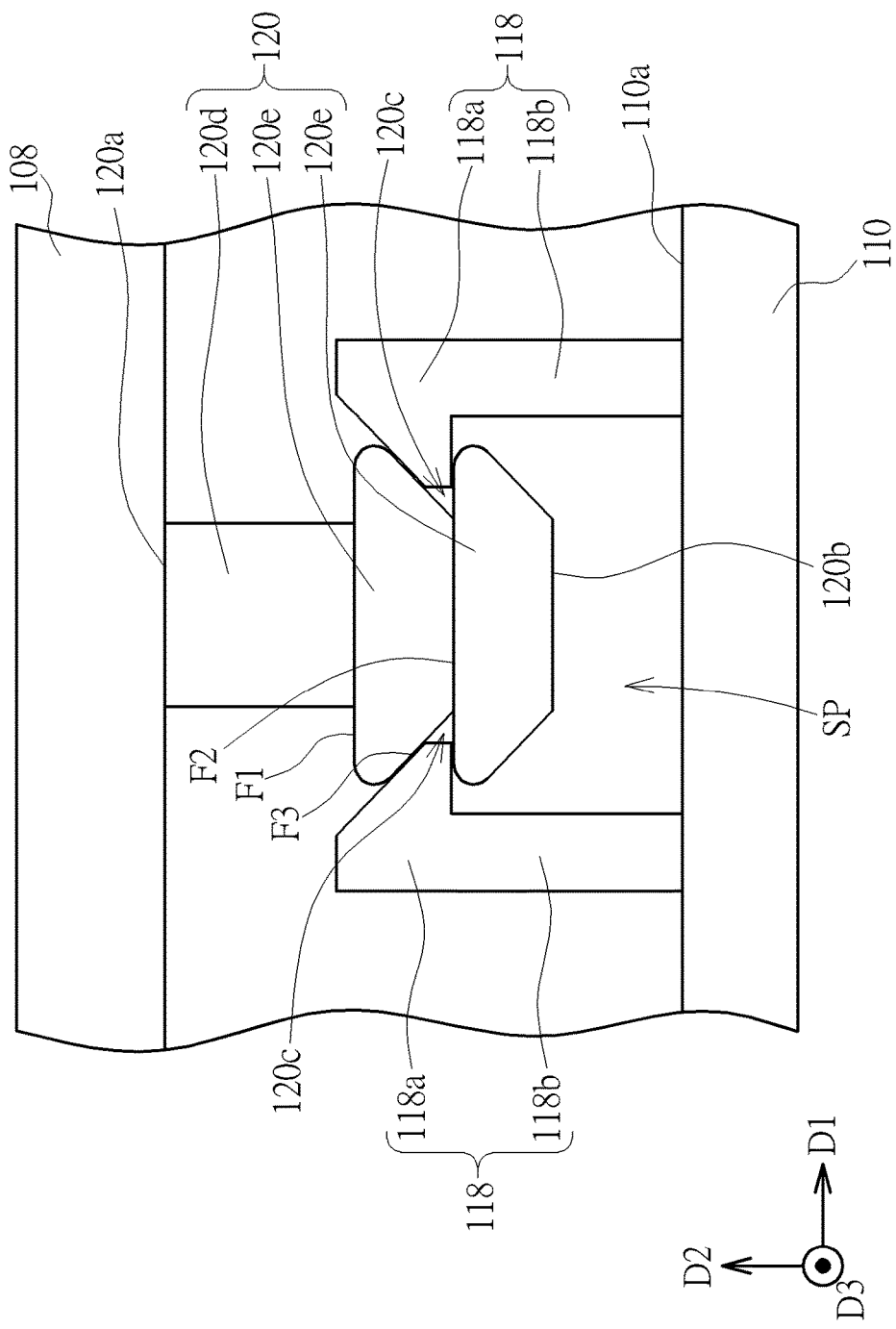
FIG. 7 schematically illustrates an enlarged view of a region B shown in FIG. 6.

FIG. 7 schematically illustrates an enlarged view of a region B shown in FIG. 6. Referring to FIG. 7, each support structure 116 may include at least two hook structures 118 and a pillar 120. Each hook structure 118 includes a hook 118a connected to the top surface 110a, and the hooks 118a of each support structure 116 face each other. The pillar 120 of each support structure 116 has a first surface 120a and a second surface 120b opposite to each other, in which the first surface 120a may be convex or planar and be in contact with the optical film stack 108 for supporting the optical film stack 108. Also, the pillar 120 has a notch 120c surrounding a sidewall of the pillar 120, so that the hooks 118a of each support structure 116 can be engaged with the notch 120c. Accordingly, the pillar 120 can be fixed with the hook structures 118, and the second surface 120b of the pillar 120 can be spaced apart from the top surface 110a. For this reason, the optical film stack 108 can be supported and prevented from collapse by the support structures 116 when the vehicle is not hit, so as to be spaced apart from the top surface 110a. The present disclosure is not limited that all the support structures 116 include the hook structures 118 and the pillar 120, and at least one of the support structures 116 may include the hook structures 118 and the pillar 120.

Figure 8:
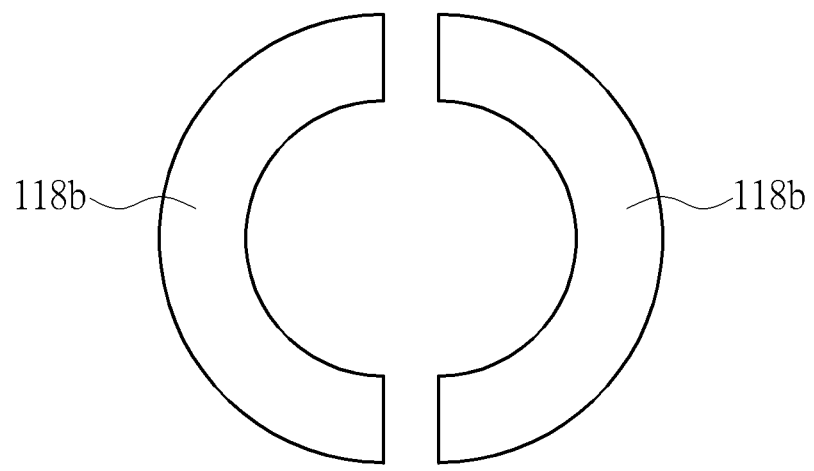
FIG. 8 schematically illustrates a top view of the first pillar parts according to an embodiment of the present disclosure.

Specifically, each hook structure 118 includes a first pillar part 118b connected to the top surface 110a, and a space SP exists between the first pillar parts 118b of each support structure 116. Since a width of the space SP is greater than a width of the pillar 120, the space SP is capable of accommodating the pillar 120 when the vehicle is hit. FIG. 8 schematically illustrates a top view of the first pillar parts 118b according to an embodiment of the present disclosure. Referring to FIG. 8, each first pillar part 118b may be a semi annular cylinder with a hollow, and the hollows of the first pillar parts 118b face each other and form the space SP.

Furthermore, referring FIG. 7 again, the notch 120c of each pillar 120 may be disposed between the first surface 120a and the second surface 120b. On the other hand, each pillar 120 may include a second pillar part 120d between the top surface 120a and the notch 120c, so that the notch 120c of each pillar 120 may be disposed closer to the bottom surface 120b than the top surface 120a. Accordingly, the collapsed range of the optical film stack 108 and the display panel 104 may be adjusted by heights of the second pillar parts 120d. The pillar 120 may further include two annular parts 120e protruding from the sidewall of the pillar 120 respectively, and the notch 120c is formed between the two annular parts 120e. Specifically, the annular parts 120e are connected to each other. Each annular part 120e has a first flat surface F1 and a second flat surface F2 opposite to each other, and an area of the first flat surface F1 is greater than an area of the second flat surface F2, so each annular part 120e may further has an inclined surface F3 connected between the first flat surface F1 and the second flat surface F2. The second flat surface F2 of one of the annular part 120e closer to the top surface 120a contacts the first flat surface F1 of the other one of the annular part 120e, so that the notch 120c may incline to the optical film stack 108. Accordingly, when the vehicle is hit, each pillar 120 may be more easily pushed into the space SP, and the display device 100 may not be easy to be broken.

Figure 9:
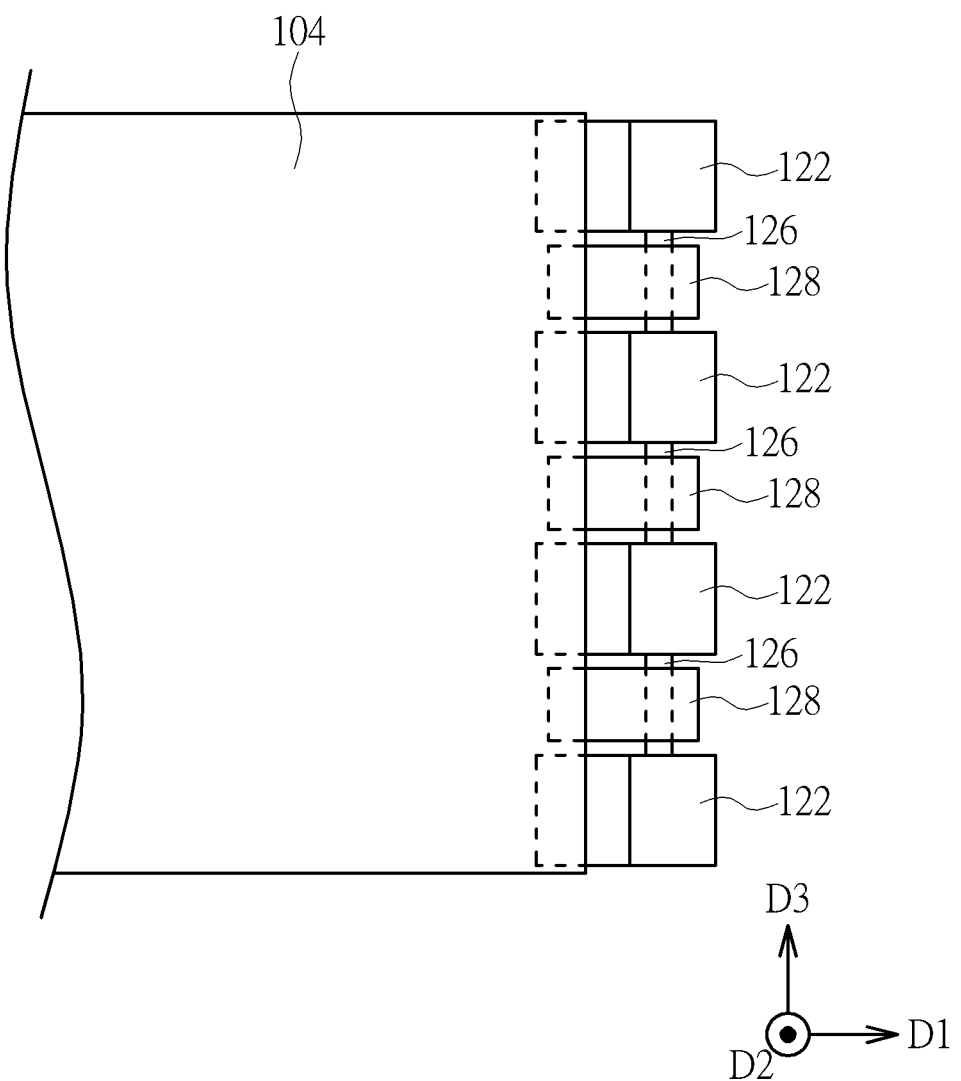
FIG. 9 schematically illustrates an enlarged view of a region A2 shown in FIG. 1.
Figure 10:
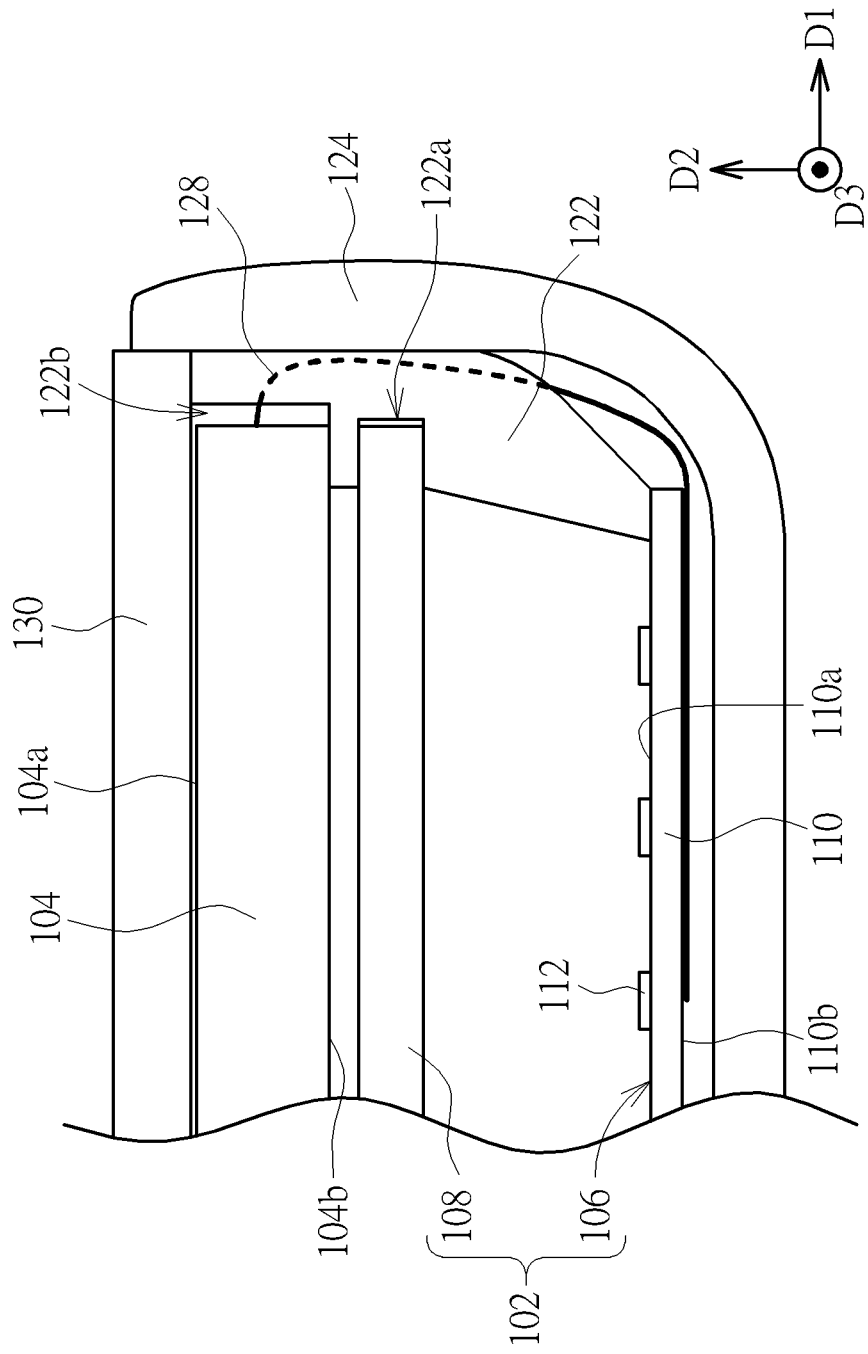
FIG. 10 schematically illustrates a top view of a part of the display device corresponding FIG. 9.

FIG. 9 schematically illustrates an enlarged view of a region A2 shown in FIG. 1, and FIG. 10 schematically illustrates a top view of a part of the display device corresponding FIG. 9. Referring to FIG. 9 and FIG. 10 together with FIG. 1, the display device 100 may further include a plurality of fixing structures 122 spaced apart from each other. Also, the display device 100 may further include a bezel 124 for accommodating the backlight module 102, the display panel 104 and the fixing structures 122. A side of each fixing structure 122 adhered to the inner sidewall of the bezel 124. Each fixing structure 122 has a recess 122a opposite to the bezel 124, and a side of the optical film stack 108 can be fixed in the recesses 122a. For example, the optical film stack 108 may adhere into the recesses 122a, so that the optical film stack 108 can be fixed on the bezel 124. In this embodiment, the display device 100 may further include a plurality of links 126, in which each link 126 is connected to two of the fixing structures 122 adjacent to each other. Also, the display device 100 may further include at least one flexible circuit board 128 electrically connected to the display panel 104 disposed on the optical film stack 108. Since a width of each link 126 in the first direction D1 is less than a width of each fixing structure 122 in the first direction D1 and a width of each link 126 in the second direction D2 is less than a width of each fixing structure 122 in the second direction D2, the flexible circuit board 128 may be disposed between two of the fixing structures 122 adjacent to each other, which means one end of the flexible circuit board 128 may be connected to the display panel 104, and the flexible circuit board 128 can extend through the space between two adjacent fixing structures 122 to the underside of the light source 106. For example, the flexible circuit board 128 may adhere to a bottom surface 110b of the substrate 110. Through separating the fixing structures 122 instead of unifying the fixing structures 122 as a whole, the flexible circuit board 128 can be disposed in the space between the adjacent fixing structures 122. Thus, there is no need to add a space between the fixing structures 122 and the bezel 124 for disposing the flexible circuit board 128, and a frame width of the display device 100 may be shrunk. In one embodiment, the display device 100 may include a cover lens 130 disposed on the front surface 104a of the display panel 104. In this embodiment, each fixing structure 122 may have a concavity 122b on its top surface for disposing the display panel 104. The display panel 104 may also adhere to the concavities 122b. Also, bottom surfaces of the fixing structures 122 may adhere to the substrate 110.

In summary, when the first included angle is less than the second included angle, and the first light-emitting units on the first local surface with the first normal direction and the second light-emitting units on the second local surface with the second normal direction different from the first normal direction are provided with the first current and second current respectively, and the first current is less than the second current in the display device of the present disclosure. Accordingly, the light intensity distribution from the first light-emitting units and the light intensity distribution from the second light-emitting units received by the predetermined object can be more uniformed, thereby providing more comfortable light intensity distribution to the user.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
a substrate, having a top surface facing an object, wherein the top surface comprises a first local surface and a second local surface, the first local surface has a first normal direction, the object and a center of the first local surface form a first line, an included angle between the first line and a first extended line starting from the center of the first local surface and paralleling the first normal direction defines as a first included angle, and wherein the second local surface has a second normal direction, the object and a center of the second local surface form a second line, an included angle between the second line and a second extended line starting from the center of the second local surface and paralleling the second normal direction defines as a second included angle;
a plurality of first light-emitting units, disposed on the first local surface;
a first driving unit, electrically connected to the first light-emitting units, and the first driving unit providing a first current to each first light-emitting unit;
a plurality of second light-emitting units, disposed on the second local surface; and
a second driving unit, electrically connected to the second light-emitting units, and the second driving unit providing a second current to each second light-emitting unit, wherein the first included angle is less than the second included angle, and the first current is less than the second current.

2. The display device according to claim 1, wherein a direction perpendicular to a plane constituted by two sides of the first local surface defines as the first normal direction, and a direction perpendicular to a plane constituted by two sides of the second local surface defines as the second normal direction.

3. The display device according to claim 1, wherein the first local surface and the second local surface are curved respectively.

4. The display device according to claim 1, wherein the first included angle is in a first angle range, the second included angle is in a second angle range, and the first angle range does not overlap the second angle range.

5. The display device according to claim 4, wherein the top surface further comprises a third local surface, the first local surface is disposed between the second local surface and the third local surface, and wherein the third local surface has a third normal direction, the object and a center of the third local surface form a third line, an included angle between the third line and a third extended line starting from the center of the third local surface and paralleling the third normal direction defines as a third included angle, the third included angle is in the second angle range, the display device further comprises a plurality of third light-emitting units disposed on the third local surface and a third driving unit electrically connected to the third light-emitting units, and the third driving unit provides a third current the same as the second current to each third light-emitting unit.

6. The display device according to claim 4, wherein the top surface further comprises a fourth local surface, the second local surface is disposed between the first local surface and the fourth local surface, and wherein the fourth local surface has a fourth normal direction, the object and a center of the fourth local surface form a fourth line, an included angle between the fourth line and a fourth extended line starting from the center of the fourth local surface and paralleling the fourth normal direction defines as a fourth included angle, the fourth included angle is in the second angle range, and the display device further comprises a plurality of fourth light-emitting units disposed on the fourth local surface and electrically connected to the second driving unit respectively.

7. The display device according to claim 1, wherein a minimum distance between the object and the first local surface ranges from 20 centimeters to 120 centimeters.

8. The display device according to claim 1, wherein the display device further comprises an optical film stack disposed on the first light-emitting units and the second light-emitting units.

9. The display device according to claim 8, further comprising a first spacing between the optical film stack and the first local surface, and a second spacing between the optical film stack and the second local surface, wherein the first spacing is substantially the same as the second spacing.

10. The display device according to claim 8, further comprising a plurality of support structures disposed between the optical film stack and the top surface.

11. The display device according to claim 10, wherein at least one of the support structures comprises at least two hook structures and a pillar, the pillar has a notch surrounding a sidewall of the pillar, each hook structure comprises a hook engaged with the notch, and the pillar is spaced apart from the top surface.

12. The display device according to claim 11, wherein the pillar has a first surface and a second surface opposite to each other, the first surface is in contact with the optical film stack, and the notch is disposed between the first surface and the second surface.

13. The display device according to claim 11, wherein each hook structure comprises a pillar part connected to the top surface, a space exists between the pillar parts, and a width of the space is greater than a width of the pillar.

14. The display device according to claim 13, wherein each pillar part is a semi annular cylinder with a hollow, and the hollows of the pillar parts face each other.

15. The display device according to claim 13, wherein the pillar comprises two annular parts protruding from the sidewall of the pillar respectively, and the notch is formed between the two annular parts.

16. The display device according to claim 1, further comprising a display panel having a back surface, wherein the substrate is disposed on the back surface, and the top surface faces the display panel.

17. The display device according to claim 16, further comprising a plurality of fixing structures and an optical film stack, the optical film stack being disposed between the display panel and the substrate, wherein the fixing structures are spaced apart from each other, each fixing structure has a recess, and a side of the optical film stack is fixed in the recesses.

18. The display device according to claim 17, further comprising a plurality of links, and each link is connected to two of the fixing structures adjacent to each other.

19. The display device according to claim 17, further comprising at least one flexible circuit board electrically connected to the display panel, wherein the flexible circuit board is disposed between two of the fixing structures.

20. The display device according to claim 17, wherein the display panel and the substrate adhere to the fixing structures respectively.

* * * * *